J. P. SWAN.
FITTING FOR PRESSURE GAGES.
APPLICATION FILED JAN. 25, 1915.
1,200,432. Patented Oct. 3, 1916.
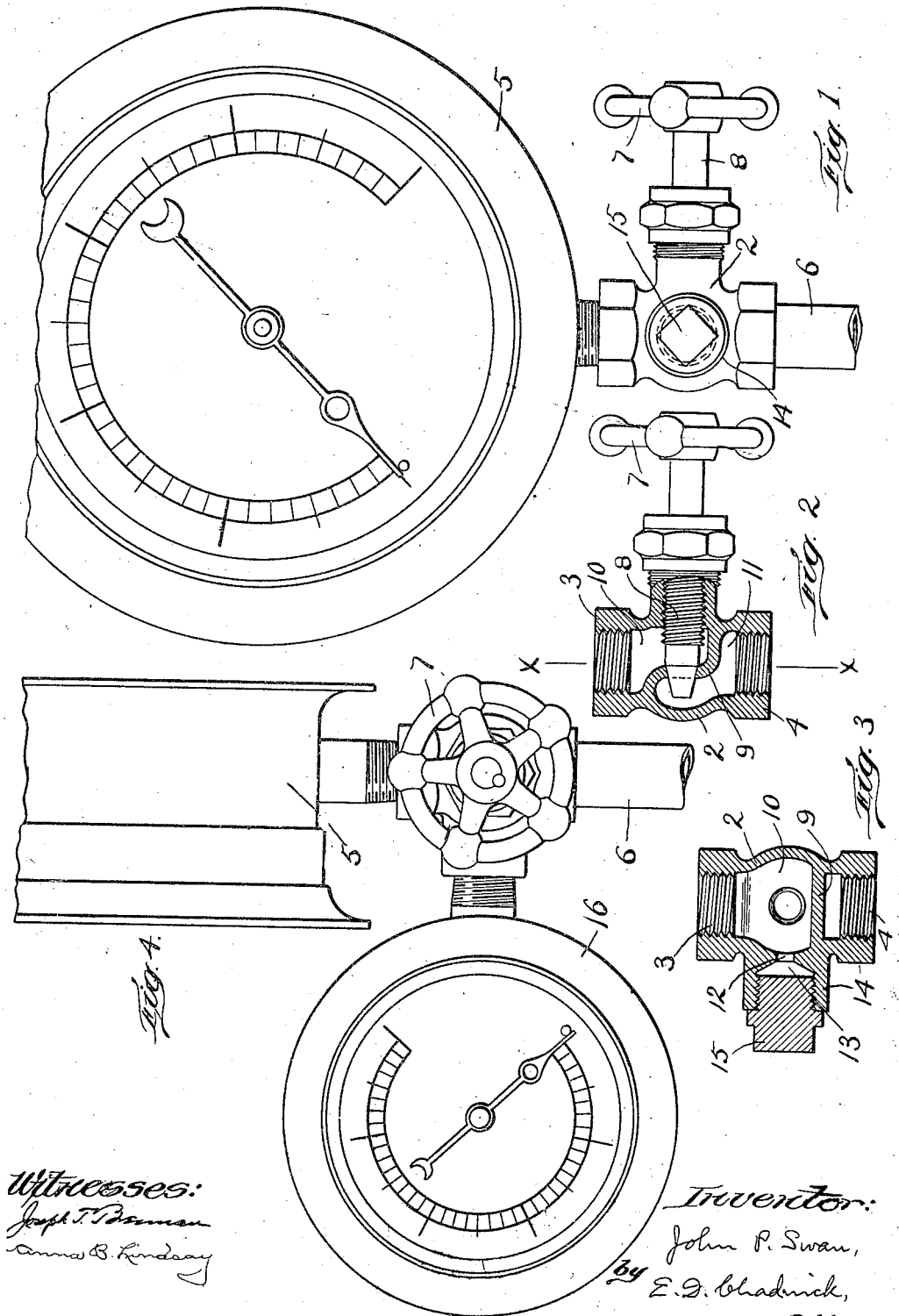

UNITED STATES PATENT OFFICE.

JOHN P. SWAN, OF PROVIDENCE, RHODE ISLAND, ASSIGNOR TO GENERAL FIRE EXTINGUISHER COMPANY, OF PROVIDENCE, RHODE ISLAND, A CORPORATION OF NEW YORK.

FITTING FOR PRESSURE-GAGES.

1,200,432.   Specification of Letters Patent.   Patented Oct. 3, 1916.

Application filed January 25, 1915. Serial No. 4,145.

*To all whom it may concern:*

Be it known that I, JOHN P. SWAN, a citizen of the United States, residing at Providence, in the county of Providence and State of Rhode Island, have invented new and useful Improvements in Fittings for Pressure-Gages, of which the following is a specification.

This invention relates to fittings for use in connection with pressure gages when attached to pipe systems or other apparatus containing fluid under pressure.

In order to make sure that an installation of this character is in safe and efficient working condition it is generally desirable to test the accuracy of the pressure gage from time to time, which is commonly done by temporarily connecting a supplementary or testing gage to the installation and simultaneously subjecting both gages to the existing pressure, whereupon a comparison of their readings is made. The present invention is intended to provide a simple form of fitting which will enable such a testing operation to be performed with facility and under such conditions as to secure reliable results, and resides in certain features of construction and arrangement hereinafter described in connection with the accompanying drawing, in which:—

Figure 1 is an elevation showing the fitting interposed between a pressure gage and the system to which the gage is connected; Fig. 2 is a similar view of the detached fitting, shown partly in longitudinal section; Fig. 3 is a longitudinal section on the line x—x in Fig. 2, the valve being omitted; and Fig. 4 is an elevation illustrating the use of the fitting in connection with a test gage.

Referring to the drawing, the fitting therein illustrated comprises a hollow body portion 2 having open ends 3 and 4 which are internally screw-threaded for the reception respectively of the threaded stem of a pressure gage 5 and the threaded end of a pipe 6 leading from the system or apparatus to which the gage 5 is attached. The internal passage between the ends of the body portion 2 is controlled by a hand-operated valve 7, preferably of the familiar globe valve type, the stem 8 of which passes through one side of the body portion 2, in threaded engagement therewith, and has its inner end tapered to enter and fit a perforation formed in a partition 9, which extends across the interior of the body portion and divides it into two chambers 10 and 11 in communication with the open ends 3 and 4 respectively. The chamber 10 is also in open communication through a perforation 12 with another chamber 13 provided by a hollow extension 14 which projects laterally from one side of the body portion 2 and is internally screw-threaded to receive a plug 15, whereby said chamber 13 may be tightly closed at its outer end.

When the fitting above described is interposed between the pressure gage 5 and pipe 6, as shown in Fig. 1, said gage is in open communication with the two chambers 10 and 13, both of which lie on the same side of the partition 9. Under normal conditions the outer end of the chamber 13 is closed by the plug 15 and the valve 7 is open, so that the gage 5 is subjected to the pressure in the system to which it is connected and indicates the same in the usual manner. When it is desired to test the accuracy of this gage, however, the valve 7 is closed, the plug 15 is removed and the stem of a test gage 16 is screwed into the extension 14, as shown in Fig. 4, whereupon the valve 7 is opened and the pressure in the system is made effective upon both of the gages simultaneously, the readings of which may then be compared. After this has been done the valve 7 is closed and the test gage is unscrewed and replaced by the plug 15, whereupon the valve is opened and the parts are thus restored to their normal condition.

It will be seen that the fitting above described is not only of simple and inexpensive construction but also contains within its own structure all the parts and features necessary for connecting a pressure gage to the system or apparatus of which it is to form a part, and for applying a test gage when desired and simultaneously subjecting both gages to the pressure in the system, thereby making it possible to dispense with supplementary parts and fittings which it has been necessary to employ heretofore for the purpose of testing the pressure gages in similar situations. Any usual or suitable form of manually-operated valve may be employed instead of the particular form of valve illustrated, if preferred, and the other details of construction of the fitting may be modified in various ways without departing from the invention.

I claim:

A fitting adapted to serve as a permanent connection between a pressure gage and a pipe leading thereto and comprising a hollow body portion having open ends for attachment to said gage and pipe respectively, a manually-operated valve controlling the passage through the interior of said body portion between said open ends, a hollow extension carried by the body portion and having an internal opening leading into said passage on the pressure-gage side of the valve, said extension having an external opening adapted to be connected to a test gage, and a removable plug normally closing said external opening.

In testimony whereof, I have hereunto subscribed my name this 14th day of January, 1915.

JOHN P. SWAN.

Witnesses:
A. E. STRAIGHT,
OZRO C. BARROWS.